United States Patent [19]

Micheli

[11] Patent Number: 4,627,966
[45] Date of Patent: Dec. 9, 1986

[54] FORMATION OF FINE PARTICLE SINTERABLE CERAMIC POWDERS

[75] Inventor: Adolph L. Micheli, Mt. Clemens, Mich.

[73] Assignee: General Motors Corporation, Detroit, Mich.

[21] Appl. No.: 850,028

[22] Filed: Apr. 10, 1986

Related U.S. Application Data

[63] Continuation of Ser. No. 591,177, Mar. 19, 1984, abandoned.

[51] Int. Cl.$^4$ .................. C01F 17/00; C01G 25/02
[52] U.S. Cl. ......................... 423/263; 423/266; 423/608; 423/610; 423/598; 423/592; 423/630
[58] Field of Search ............... 423/608, 263, 265, 266

[56] References Cited

U.S. PATENT DOCUMENTS

| | | | |
|---|---|---|---|
| 3,758,418 | 9/1973 | Leonard et al. | 423/630 |
| 3,908,002 | 9/1975 | Holler | 423/630 |
| 4,010,242 | 3/1977 | Iler et al. | 423/608 |
| 4,462,974 | 7/1984 | Pastor et al. | 423/608 |
| 4,501,818 | 2/1985 | Rossi | 423/608 |

FOREIGN PATENT DOCUMENTS 2327180  5/1973  Fed. Rep. of Germany ...... 423/592

*Primary Examiner*—H. T. Carter
*Attorney, Agent, or Firm*—George A. Grove

[57] ABSTRACT

Sinterable metal-oxygen composition powders are prepared by mixing aqueous solutions of the metal salt and of poly(acrylic acid), or its ammonium salt, to form a precipitate which is dried, ignited to remove the organic composition and calcined to form the metal oxide or metal-oxygen compound powder.

3 Claims, No Drawings

FORMATION OF FINE PARTICLE SINTERABLE CERAMIC POWDERS

This is a continuation of application Ser. No. 591,177 filed on Mar. 19, 1984 and now abandoned.

This invention relates to making metal oxide or other metal-oxygen containing ceramic precursor powders that are readily compacted and sintered into strong, dense, bodies. More specifically, it relates to a precipitation method that is very effective in forming such precursor powders.

Many useful articles of commerce are made by pressing together suitable powders and sintering or firing the pressed body to form a strong, dense article. In this practice it is necessary to start with particles that can be pressed and sintered into a relatively high density, fine grain body. Good sinterability of ceramic powders requires fine particle size and fairly uniform particle shape. After compacting such powder the green body contains uniform small particles with small even voids and a relatively high green density. These compacted powders sinter well.

Traditionally, mixtures of suitable metal oxide precursor materials have been pulverized to obtain a fine particle size, for example, less than 1 $\mu$m. Fracturing relatively large particles into small ones produces a wide particle size distribution and irregular shaped particles that compact with large irregular voids. Such materials have to be fired to relatively high temperatures to consolidate the body and achieve adequate density.

Chemical precipitation of ceramic precursor materials has also been practiced. Here, water-soluble salts of the metal or metals of interest are treated with a base to precipitate the respective hydroxides. Precipitated hydroxides usually contain particles having high surface areas, but electron micrographs show them to consist of irregular shaped flasks that do not sinter well.

Hamling and Naumann, U.S. Pat. No. 4,065,554, contact precursor metal compounds with solid carbohydrate materials or liquid dispersions of them to form an intimate mixture. The mixture is then ignited to decompose the carbohydrate and produce agglomerates of fine metal-oxygen containing particles. The mass that is ignited contains the anions initially associated with the metals. It also contains any other materials entrained with the carbohydrate.

There remains a need for an efficient method of producing readily compactible and sinterable ceramic precursor powders.

Accordingly, it is an object of the present invention to provide an improved method of precipitating metal and oxygen containing materials that can be processed into precursor powder capable of being readily compacted and sintered into dense, strong, ceramic bodies.

It is a more specific object of this invention to provide a method of making such sinterable powder by initially precipitating divalent or higher valence metal ions from aqueous solution with a suitable polymeric acid.

SUMMARY OF THE INVENTION

In accordance with a preferred embodiment of the invention, these and other objects and advantages are accomplished as follows.

An aqueous solution of a suitable salt of one or more desired metals is prepared. A suitable water-soluble poly(acrylic acid) is selected. A poly(acrylic acid) having a molecular weight of about 5,000 is preferred because it readily forms aqueous solutions of suitable viscosity for processing hereunder. This acid is preferably neutralized with ammonium hydroxide. The solution of metal salt and the neutralized poly(acrylic acid) solution are rapidly mixed. A precipitate, typically white, forms. The precipitate is separated from the mother liquor by filtering or by centrifuging. The precipitate can be washed with water to remove soluble salts formed in the double decomposition reaction. The precipitate is dried and then heated to burn out organic material and leave an ash of metal oxide or other metal and oxygen containing compounds. The ash is then calcined, if necessary, at a suitable elevated temperature to form the desired metal oxide precursor material or the reaction product of two or more metal oxides.

The calcined material is made up of a relatively loose agglomeration of fine, relatively uniformly sized particles. The calcined product may be ball milled to produce a very fine, uniformly sized particle mixture that can be pressed and sintered into a dense, strong, ceramic body.

The above-described practice can be used to precipitate water-soluble salts of divalent and higher valence metals. For example, the practice has been used in producing dense, strong bodies of yttria stabilized zirconia, yttria, alumina, titania, barium titanate and lead titanate.

Other embodiments and advantages of my invention will become more apparent from a detailed description thereof, which follows.

I use a poly(acrylic acid) precipitating agent that is soluble in water to form a solution of suitable viscosity for precipitating useful ceramic precursor materials. An example of a suitable poly(acrylic acid) is one having a molecular weight of about 5,000. A material currently produced by B. F. Goodrich Company and designated "Goodrite K-732" is an example of such a suitable material. As is known, the repeating unit in the acrylic acid polymer is:

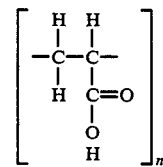

Thus, the polyacrylic acid has upwards of 70 pendant acid groups in its polymer chains.

When an aqueous solution of a divalent, trivalent or tetravalent metal is added to the solution of the polymeric acid or its ammonium salt, the polyvalent cations crosslink along two or more chains to form a water-insoluble organic salt. The poly(acid) solution is fairly acid, and with most metals it is preferable to first neutralize the acid with concentrated ammonium hydroxide to form the ammonium salt of the poly(acrylic acid). Whether the soluble metal salt is precipitated with polyacrylic acid or a suitable salt, I have found that the resulting precipitate is extremely useful in the preparation of excellent precursor materials for the production of sintered ceramic bodies.

EXAMPLE 1

Yttria Stabilized Zirconia

Zirconyl acetate (225 grams) was dissolved in one liter of water. Separately, 344 grams poly(acrylic acid) (Goodrite K-732, B. F. Goodrich Co.) was neutralized with 126 milliliters of concentrated aqueous ammonium hydroxide. The neutralized mixture was diluted with water to a total volume of 3 liters. The zirconyl acetate solution was added to the ammonium polyacrylate solution with rapid mixing. A white precipitate formed. The precipitate is a product of the double decomposition reaction between zirconyl acetate and ammonium polyacrylate to form zirconyl polyacrylate and ammonium acetate.

The precipitate is separated by filtering or centrifuging. The precipitate is quite water-insoluble and may be repeatedly washed with water to remove ammonium acetate and other water-soluble impurities. The precipitate was then dried at 100° and ignited at 400° C. to burn out the organic material. The ash was then calcined at 800° C. for one hour. The product is zirconia, $ZrO_2$, and microscopic examination revealed that it is in the form of an agglomeration of small, relatively uniformly sized particles. The calcined material was ball milled for 6 hours (others up to 24 hours) in water, using alumina mill media. The milled product was dried and screened through 100 mesh screens. This powder had a surface area of 11 $m^2/g$. The 24 hour mill powder had a surface area of 12 $m^2/g$.

To 100 grams of the screened $ZrO_2$ powder was added 4 grams of a precipitated yttria as $Y(OH)_3$. This mixture was further mixed by ball milling in water for 2 hours using alumina mill media. The mixture was then dried and forced through a 100 mesh screen. The zirconia-yttria mixture (approximately 2.5 mole percent yttria) was pressed into physical test slabs measuring 6.35 cm long×0.95 cm wide×0.47 cm thick at 20,000 psi. The green slabs were sintered 5 hours in air at 1,320° C.

X-ray analysis of the slabs indicated a crystal structure that was mainly tetragonal with a minor amount of monoclinic phase. The sintered material had a density of 5.63 grams per cc, and a grain size of 0.12 $\mu m$. The strength of the sintered slabs was measured by determining its modulus of rupture (hereinafter sometimes MOR) in a 4-point deflection test. This is a known test in which a force is applied to the upper surface of the slab. The force is distributed between two points spaced ½ inch apart (A). The slab is supported on its bottom surface at two points spaced one inch apart (L). The modulus of rupture was calculated using the following general formula:

Modulus of Rupture=3×Breaking Force×(L-A)/2×Width of Slab×(Thickness of Slab)$^2$ The representative modulus of rupture of the yttria partially stabilized zirconia slabs prepared by this example was 656 MPa (95,000 psi).

The properties of sintered $ZrO_2$–2.5 mole percent $Y_2O_3$ slabs, prepared in accordance with this example, were compared with slabs pressed and sintered the same way from three commercially available yttria containing zirconia powder samples of the same composition. The strongest slabs were produced from a commercially available material with the trade designation "Zircar". It had the following properties:

| | |
|---|---|
| X-Ray Analysis | Tetragonal Crystal Structure |
| Density | 5.15 g/cc |
| Fired Grain Size | 0.20 $\mu m$ |
| MOR (Strength) | 69,190 psi (656 MPa) |

The zirconia powder produced by my method produced a stronger, more dense body than that produced by the most favorable of other powders of the same composition.

EXAMPLE 2

Coprecipitated Zirconia Plus 2.5 Mole Percent Yttria

Zirconyl acetate (219.4 grams) and yttrium chloride hexahydrate (7.6 grams) were dissolved in one liter of water. A 3 liter aqueous solution of ammonium hydroxide neutralized polyacrylic acid was prepared as in Example 1. The aqueous solution of metal salts was added to the ammonium polyacrylate solution with rapid mixing. The precipitate was filtered from the mother liquor and washed with water. It was dried at 100° C. and the organic material burned out at 400° C. The ash was calcined at 800° C. for one hour. 100 grams of the calcined material was ball milled dry using alumina milling media and 3 grams of a 2:1 mix of Carbowax/Thixcin. The mixture was milled for 20 hours. The surface area of the powder was 12.5 $m^2/g$.

The mill product was then screened through a 100 mesh screen and pressed into physical test slabs as in Example 1 at 10,000 psi. The slabs were sintered in air at 1,418° C. for 10 hours. The test slabs had the following properties:

| |
|---|
| Density - 5.81 g/cc |
| X-Ray |
| Tetragonal - Major |
| Monoclinic - Minor |
| 200 angstroms powder particle size determined by x-ray line broadening |
| MOR (Strength) - 103,200 psi (711.8 MPa) |

A dense, strong body was thus formed from the coprecipitated powder at a modest sintering temperature.

EXAMPLE 3

Yttria ($Y_2O_3$)

Yttrium chloride hexahydrate ($YCl_3 \cdot 6H_2O$, 303 grams) was dissolved in one liter of water. Poly(acrylic acid), as in Example 1 (516 grams), was neutralized with 189 milliliters concentrated ammonium hydroxide and diluted to 3 liters total volume with water. The yttrium chloride solution was added to the ammonium polyacrylate with rapid mixing, and a white precipitate formed. The precipitate was filtered from the mother liquor and washed with water. It was dried at 100° C. and the organic material then burned out at 400° C. The ash was then calcined at 1,100° C. for one hour. Thermogravimetric analysis indicated that complete weight loss occurred at 1,100° C. Samples calcined below 1,100° C. broke apart during subsequent sintering.

The calcined product was ball milled in water using alumina mill media for 20 hours. The mill product was dried and screened through 100 mesh. The surface area of the powder was 12 square meters per gram. The powder was then pressed at 20,000 psi into test cylinders using an isostatic press. Pressed cylinders with a diameter of 1.7 cm and a length of 1.7 cm were then sintered in air for one hour at various temperatures to determine a suitable sintering temperature for approaching the theoretical density of the material. Cylinders having a density of about 99% of theoretical density were obtained by sintering for one hour at temperatures of 1,600° to 1,700° C. The achievement of such a high density in sintered yttria at such a relatively low temperature is remarkable. A commercial yttria pressed and sintered under the same conditions achieved a density of only about 80% of theoretical density. A recent publication, *Ceramic Bulletin,* American Ceramic Society, Vol. 62, No. 4 (1983), pp. 510–512, reported yttria bodies achieving a relative density of 99+ percent of theoretical density only after sintering at much higher temperatures—of the order of 2,200° C.

EXAMPLE 4

Alumina ($Al_2O_3$)

Aluminum trichloride hexahydrate (241.4 grams) was dissolved in one liter of water. Poly(acrylic acid), as in Example 1 (516 grams), was neutralized with 126 milliliters concentrated ammonium hydroxide and diluted to 3 liters with water. The aluminum chloride solution was added with rapid stirring to the ammonium polyacrylate solution, and a white precipitate formed. The white precipitate was dried at 100° C. and the organic material burned out at 400° C. The ash was calcined at 1,050° C. X-ray analysis of the calcined product showed a 50% conversion to alpha alumina. The calcined product was ball milled for 16 hours in water using alumina mill media. The mill product was dried and screened through 100 mesh. The surface area of the powder was 21 square meters per gram. Test disks, 1.27 cm in diameter, were uniaxially pressed from the powder at 20,000 psi. Various disks were sintered in air at different sintering temperatures. Disks sintered for one hour at about 1,550° C. had a density of about 96% of theoretical density.

EXAMPLE 5

Titania ($TiO_2$)

Titanium tetrachloride (327 milliliters) was added to 2 liters of ice water with rapid stirring. The titanium tetrachloride reacts with the water to form titanyl chloride solution and hydrochloric acid. Poly(acrylic acid), as in Example 1 (688 grams), was neutralized with 252 milliliters of concentrated ammonium hydroxide and diluted to 3 liters with water. The titanium chloride solution was added to the ammonium polyacrylate with rapid stirring. A titanyl polyacrylate precipitate formed. It was filtered from the mother liquor and washed with water. The precipitate was dried at 100° C. and the organic portion burned out at 400° C.

The ash was calcined at 800° C. for one hour. X-ray analysis of the calcined product indicated complete conversation to the rutile phase of titania.

The calcined product was wet ground in a ball mill, using alumina balls, for 16 hours. The milled product was dried and screened through 100 mesh. It then had a surface area of 8 square meters per gram. The powder was pressed at 20,000 psi into a number of test disks, as in Example 4. The disks were sintered in air at varying temperatures. It was found that the disks could be sintered at only 1,200° to 1,300° C. and achieve a density in excess of 95% of theoretical density.

EXHIBIT 6

Barium Titanate

In this example it was necessary to prepare a titanyl nitrate solution. This was done as follows. Titanium (IV) i-propoxide (284 grams) was added to one liter of water to precipitate titanyl hydroxide. The titanyl hydroxide precipitate was dissolved by the addition of nitric acid to form titanyl nitrate $[TiO(NO_3)_2]$. This solution was kept cold. Barium acetate (255.4 grams) was dissolved in the titanyl nitrate solution.

Poly(acrylic acid), as in Example 1 (688 grams), was neutralized with 252 milliliters of concentrated ammonium hydroxide. This mixture was diluted to 3 liters with water. The barium acetate-titanyl nitrate solution was added with rapid mixing to the ammonium polyacrylate solution. A white precipitate formed. It was filtered from the mother liquor, dried at 100° C. and the organic material burned out at 400° C.

The ash was calcined at 800° C. for one hour. X-ray analysis indicated complete conversion of the precursor materials to $BaTiO_3$.

The barium titanate powder was ball milled wet for 16 hours as in the previous examples. The mill product was dried and screened through 100 mesh. The powder had a surface area of 5 square meters per gram. The mill product was pressed at 20,000 psi into a number of test disks like those in the previous examples. The test disks were sintered at increasing temperatures. It was found that sintering in air at temperatures of 1,250° to 1,300° C. produced sintered bodies having a density of about 95% of the density of the theoretical density of barium titanate. It was found that commercially available barium titanate powders required sintering at temperatures of 1,350° to 1,400° C. to achieve like densities.

EXAMPLE 7

Lead Titanate ($PbTiO_3$)

A cold titanyl nitrate solution was prepared following the procedure described in the above example by starting with 284 grams of titanium (IV) i-propoxide. Lead acetate trihydrate (379.3 grams) was dissolved in the titanyl nitrate solution.

Poly(acrylic acid), like that in the previous examples (688 grams), was neutralized with 252 milliliters of concentrated ammonium hydroxide and diluted to a volume of 3 liters with water. The solution of the metal salts was added to the ammonium precipitate formed.

The precipitate was filtered from the mother liquor, dried at 100° C. and the organic material burned out at 400° C. X-ray analysis showed almost complete conversion to lead titanate at this temperature.

Thus, treatment of an aqueous solution of one or more polyvalent metal salts with poly(acrylic acid) or ammonium polyacrylate provides several advantages to one who wishes to make strong, dense, ceramic articles. A metal polyacrylate precipitate forms which is readily separable from the mother liquor and can be washed clean of extraneous ions. It is dried and the organic portion of the precipitate burned off. The resulting ash can be calcined if necessary to form a finely divided particles of metal oxide or other desired metal-oxygen compositions. The particles are generally spherical and of substantially uniform size. The calcined product can be pressed into a body of desired configuration and sintered at a suitable, relatively low temperature to form a dense, strong body. The sintering temperature required on the pressed material resulting by practice of my process is no higher than, and is usually lower than, sintering temperatures required using powders produced by other means.

In most instances it will be preferred to use the ammonium salt (or its equivalent, e.g., an amine salt) of poly(acrylic acid), as the precipitating agents. Most metal-polyacrylate salts are less soluble in ammonium solutions than the acid solutions.

In the above examples the precipitate was washed free of the ammonium salt, e.g., ammonium chloride, acetate or nitrate. This is desirable, but not necessary. The ammonium salts will volatilize at 400° C. when the organic content is burned out.

While my invention has been described in terms of a few specific examples thereof, it will be appreciated that other forms could readily be adapted by one skilled in the art. Accordingly, the scope of my invention is to be considered limited only by the following claims.

I claim:

1. A method of preparing a sinterable metal oxide ceramic precursor powder, comprising
    mixing an aqueous solution of polyvalent metal cations of one or more metals taken from the group consisting of yttrium and zirconium with an aqueous solution of ammonium polyacrylate to form a metal polyacrylate precipitate,
    separating the precipitate from the aqueous mother liquid,
    burning out the organic portion of the precipitate, and
    calcining the ash to form a sinterable ceramic precursor powder.

2. A method of preparing zirconia powder combined with a tetragonal crystal stabilizing amount of yttria that is readily compactible and sinterable to a dense, strong, zirconia body of tetragonal crystal structure, comprising
    mixing an aqueous solution comprising polyvalent zirconium ions and polyvalent yttrium ions, with an aqueous solution of ammonium polyacrylate to form a precipitate comprising zirconium polyacrylate and yttrium polyacrylate,
    separating the precipitate from the mother liquor, and
    burning out the organic portion of the precipitate, and calcining the ash to form yttria-containing zirconia powder.

3. A method of preparing yttria powder in a form that can be compacted and sintered to form a dense, strong, yttria body, comprising
    mixing an aqueous solution of polyvalent yttrium ions with an aqueous solution of ammonium polyacrylate to precipitate yttrium polyacrylate,
    separating the precipitate from the mother liquor, and
    burning out the organic portion of the precipitate and calcining the ash to form yttria powder.

* * * * *